US 9,507,837 B2

United States Patent
Fan et al.

(10) Patent No.: US 9,507,837 B2
(45) Date of Patent: Nov. 29, 2016

(54) REFERENCE DATA SEGMENTATION FROM SINGLE TO MULTIPLE TABLES

(71) Applicant: Oracle International Corporation, Redwood Shores, CA (US)

(72) Inventors: Irene Fan, Saratoga, CA (US); Chor Chung Ng, Cupertino, CA (US); Rajan Modi, Highlands Ranch, CA (US); Johnny Gau, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 52 days.

(21) Appl. No.: 13/633,064

(22) Filed: Oct. 1, 2012

(65) Prior Publication Data
US 2014/0095522 A1 Apr. 3, 2014

(51) Int. Cl.
*G06F 7/00* (2006.01)
*G06F 17/30* (2006.01)

(52) U.S. Cl.
CPC ... *G06F 17/30563* (2013.01); *G06F 17/30557* (2013.01)

(58) Field of Classification Search
CPC .............. G06F 17/30179; G06F 17/30005; G06F 17/30569; G06F 17/30289; G06F 17/30292; G06F 17/30294; G06F 17/30297; G06F 17/30303; G06F 17/30312; G06F 17/30321; G06F 17/30557; G06F 17/30056; G06F 17/30563; G06F 17/30339
USPC ....... 707/802, 790, 999.204, 999.103, 999.1, 707/803, 756; 711/170, 173
See application file for complete search history.

(56) References Cited

U.S. PATENT DOCUMENTS

| 6,374,256 B1 * | 4/2002 | Ng et al. ...................... 707/741 |
| 7,702,694 B1 * | 4/2010 | Perkins et al. ................ 707/790 |
| 7,849,106 B1 * | 12/2010 | Agrawal et al. .............. 707/803 |
| 2003/0084262 A1 * | 5/2003 | Weirauch ...................... 711/170 |
| 2005/0050068 A1 * | 3/2005 | Vaschillo .......... G06F 17/30569 |
| 2006/0230063 A1 * | 10/2006 | Pollinger ................... 707/103 Y |
| 2008/0183776 A1 * | 7/2008 | Kulkarni et al. ............. 707/204 |
| 2008/0320012 A1 * | 12/2008 | Loving et al. ................ 707/100 |
| 2010/0106934 A1 * | 4/2010 | Calder et al. ................. 711/173 |
| 2012/0185515 A1 * | 7/2012 | Ferrel et al. ................. 707/802 |

FOREIGN PATENT DOCUMENTS

| EP | 1 321 865 A2 | 6/2003 |
| EP | 1 321 865 A3 | 6/2003 |

OTHER PUBLICATIONS

Oracle Guide 11g release 2; "4 Partitions, Views, and Other Schema Objects", Dec. 5, 2011.*
International Search Report and Written Opinion mailed on Feb. 25, 2014 for PCT Patent Application No. PCT/US2013/062698, 12 pages.
Price, Huw; "A Short Guide to Scrambling, Masking and Obfuscating Production Data,"; *Grid Tools*; 2008; 17 pages.
International Preliminary Report on Patentability mailed Apr. 16, 2015 in Int'l Patent Application No. PCT/US2013/062698, 10 pages.

* cited by examiner

*Primary Examiner* — James Trujillo
*Assistant Examiner* — John J Morris
(74) *Attorney, Agent, or Firm* — Kilpatrick Townsend & Stockton LLP

(57) ABSTRACT

Embodiments of the present invention can be used to improve cross reference look-up performance by performing multi-table data segmentation. In accordance with an embodiment, a method of multi-table data segmentation can comprise augmenting each of a plurality of definition files associated with a database table with multi-table data. The method can further comprise creating a plurality of multi-tables. Each multi-table is associated with a different one of the plurality of definition files. The method can further comprise transposing data stored in the database table based on the plurality of definition files, and migrating the transposed data from the database table to the plurality of multi-tables.

17 Claims, 7 Drawing Sheets

| XREF_TABLE_NAME | XREF_COLUMN_NAME | ROW_NUMBER | VALUE | IS_DELETED |
|---|---|---|---|---|
| oramds:/apps/AIAMetaData/xref/BUSINESS_UNIT_ID.xref | COMMON <u>114</u> | 3 | COMMON_03 | N |
| oramds:/apps/AIAMetaData/xref/BUSINESS_UNIT_ID.xref | EBIZ_01 <u>110</u> | 3 | EBIZ_01_03 | N |
| oramds:/apps/AIAMetaData/xref/BUSINESS_UNIT_ID.xref | JDEE1_01 <u>112</u> | 3 | JDEE1_01_03 | N |
| oramds:/apps/AIAMetaData/xref/BUSINESS_UNIT_ID.xref | COMMON | 4 | COMMON_04 | N |
| oramds:/apps/AIAMetaData/xref/BUSINESS_UNIT_ID.xref | EBIZ_01 | 4 | EBIZ_01_04 | N |
| oramds:/apps/AIAMetaData/xref/BUSINESS_UNIT_ID.xref | JDEE1_01 | 4 | JDEE1_01_05 | N |
| oramds:/apps/AIAMetaData/xref/BUSINESS_UNIT_ID.xref | COMMON | 5 | COMMON_05 | N |
| oramds:/apps/AIAMetaData/xref/BUSINESS_UNIT_ID.xref | EBIZ_01 | 5 | EBIZ_01_05 | N |
| oramds:/apps/AIAMetaData/xref/BUSINESS_UNIT_ID.xref | JDEE1_01 | 5 | JDEE1_01_04 | N |
| (next row, rows for other XREF tables, etc) | ... | ... | ... | ... |

| Column name | | Purpose |
|---|---|---|
| XREF_TABLE_NAME | 502 | XREF artifact name |
| TOTAL_NUM_REGULAR_ROWS | 504 | Number of rows in XREF_DATA for this artifact that do not fall into the 1-to-many case |
| NUM_MIGRATED_REGULAR_ROWS | 506 | Number of "regular" rows that have already been migrated to the corresponding multi-table |
| TOTAL_NUM_MULTI_ROWS | 508 | Number of rows in XREF_DATA for this artifact that fall under the 1-to-many case |
| NUM_MIGRATED_MULTI_ROWS | 510 | Number of 1-to-many rows that have already been migrated to the corresponding multi-table |
| STARTED_PROCESSING | 512 | Times at which migration for this artifact began |
| FETCH_ANOMALIES_START | 514 | Time at which the query for 1-to-many rows began |
| FETCH_ANOMALIES | 516 | Time it took to query for 1-to-many rows |
| BULK_MIGRATE_START | 518 | Time at which migration of "regular" rows began |
| BULK_MIGRATE | 520 | Time it took to migrate "regular" rows |
| PROCESS_ANOMALIES_START | 522 | Time at which migration of 1-to-many rows began |
| PROCESS_ANOMALIES | 524 | Time it took to migrate 1-to-many rows |
| HAD_EXCEPTION | 526 | Non-null if exception occurred while processing the migration of this artifact |

*FIG. 5*

REFERENCE DATA SEGMENTATION FROM SINGLE TO MULTIPLE TABLES

BACKGROUND OF THE INVENTION

Embodiments of the present invention relate generally to methods and systems for providing reference data segmentation from single to multiple tables and more particularly to improving cross reference lookup performance by automatically migrating cross reference data from one table into a plurality of tables.

Presently, companies utilize many different software applications to meet different business needs. For example, a company may use different applications for customer interactions, account management, product distribution, etc. Each application likely uses its own specific data model, meaning that one application's data may be formatted or organized differently from another application's. This can make direct sharing of application data between applications difficult or impossible, even when the application data represents the same entity in both applications.

Application integration is a process which can enable applications to share data, reducing the burden and potential for error introduced by manually reentering data repeatedly for each application. One way to implement application integration is using a cross reference (XREF) database which links identifiers (IDs) for each application and with a common format. When data is passed between applications, the data can be transformed using the information stored in the XREF database. For example when a first application sends data to a second application, the data can be transformed from a first format associated with the first application to a common format and then transformed from the common format to a second format associated with the second application.

XREF data is typically stored in a single database table. This table can grow to be quite large, comprising hundreds of millions of rows. As the table grows in size, the time required to lookup XREF data in the table increases and can lead to a bottleneck in performance.

BRIEF SUMMARY OF THE INVENTION

Embodiments of the invention pertain to methods and systems which improve cross reference lookup performance by automatically migrating cross reference data from one table to a plurality of tables. In accordance with an embodiment, a method of multi-table data segmentation can comprise augmenting each of a plurality of definition files associated with a database table with multi-table data. The method can further comprise creating a plurality of multi-tables. Each multi-table is associated with a different one of the plurality of definition files. The method can further comprise transposing data stored in the database table based on the plurality of definition files, and migrating the transposed data from the database table to the plurality of multi-tables. In some embodiments, the multi-table data can include an identifier associated with one of the multi-tables and a multi-table flag.

In some embodiments, the plurality of multi-tables can be created by parsing each definition file to determine table information for that definition file, automatically generating a plurality of scripts, wherein each script defines one of the multi-tables and wherein each script is generated using the table information parsed from a different one of the definition files; and executing each of the plurality of scripts to create the plurality of multi-tables. Additionally, a mapping definition table can be created which maps each definition file to its associated multi-table.

In some embodiments, transposing the data stored in the database table can include generating a transposition script for each of the definition files. Each transposition script can define how the data associated with that definition file is segmented and transformed to be compatible with that definition file's associated multi-table. Additionally, migration of the transposed data from the database table to the plurality of multi-tables can include executing each transposition script to segment and transform the data associated with each definition file. Once segmented and transformed, the data can be copied from the database table to the plurality of multi-tables. Furthermore, after migration is complete, the migrated data can be validated.

BRIEF DESCRIPTION OF THE DRAWINGS

FIG. 1 shows an excerpt of an exemplary cross-reference table, in accordance with an embodiment of the present invention;

FIG. 5 shows an exemplary monitor table, in accordance with an embodiment of the present invention;

DETAILED DESCRIPTION OF THE INVENTION

In the following description, for the purposes of explanation, specific details are set forth in order to provide a thorough understanding of embodiments of the invention. However, it will be apparent that the invention embodiments may be practiced without these specific details.

Embodiments of the present invention can be used to improve cross reference look-up performance by performing multi-table data segmentation. In accordance with an embodiment, a method of multi-table data segmentation can comprise augmenting each of a plurality of definition files associated with a database table with multi-table data. The method can further comprise creating a plurality of multi-tables. Each multi-table is associated with a different one of the plurality of definition files. The method can further comprise transposing data stored in the database table based on the plurality of definition files, and migrating the transposed data from the database table to the plurality of multi-tables.

FIG. 1 shows an excerpt of an exemplary cross-reference table 100 of the present invention. As shown in FIG. 1, a cross-reference table can include cross-reference (XREF) data for a plurality of different entities created in different applications. The cross-reference table can be used to correlate the identities of these entities and can grow to be quite large as the number of applications and entities utilized by a business grows. The cross-reference table can be organized by XREF table name 102 and row number 104. The XREF table name 102 corresponds to a plurality of constituent hypothetical tables the comprise the cross-reference table. For example, in FIG. 1, the portion of the cross-reference table shown corresponds to the Business_Unit_ID XREF entity and therefore under the XREF table name 102 column is listed a path for the Business_Unit_ID XREF artifact 106. Each XREF artifact, as further described below, can be an XML file which defines mappings for the XREF entity associated with that XREF artifact to other entities in the cross-reference table. As shown at 108, further rows not shown may correspond to a different hypothetical table for a different XREF entity.

Each row number 104 represents a different instance of the XREF entity corresponding to that row's XREF_Table_Name. Thus, Row Numbers 3, 4 and 5 each correspond to a different instance of the Business_Unit_ID. For example, as shown in FIG. 1, a mapping exists between two application identifiers (IDs) and a common value (EBIZ_01 110; JDEE1_01 112; and COMMON 114) for each instance of the Business_Unit_ID XREF entity. Accordingly, for example, with respect to the instance corresponding to Row Number 3, EBIZ_01_03, JDEE1_01_03 and Common_03 each maps to one another.

Figure 2:
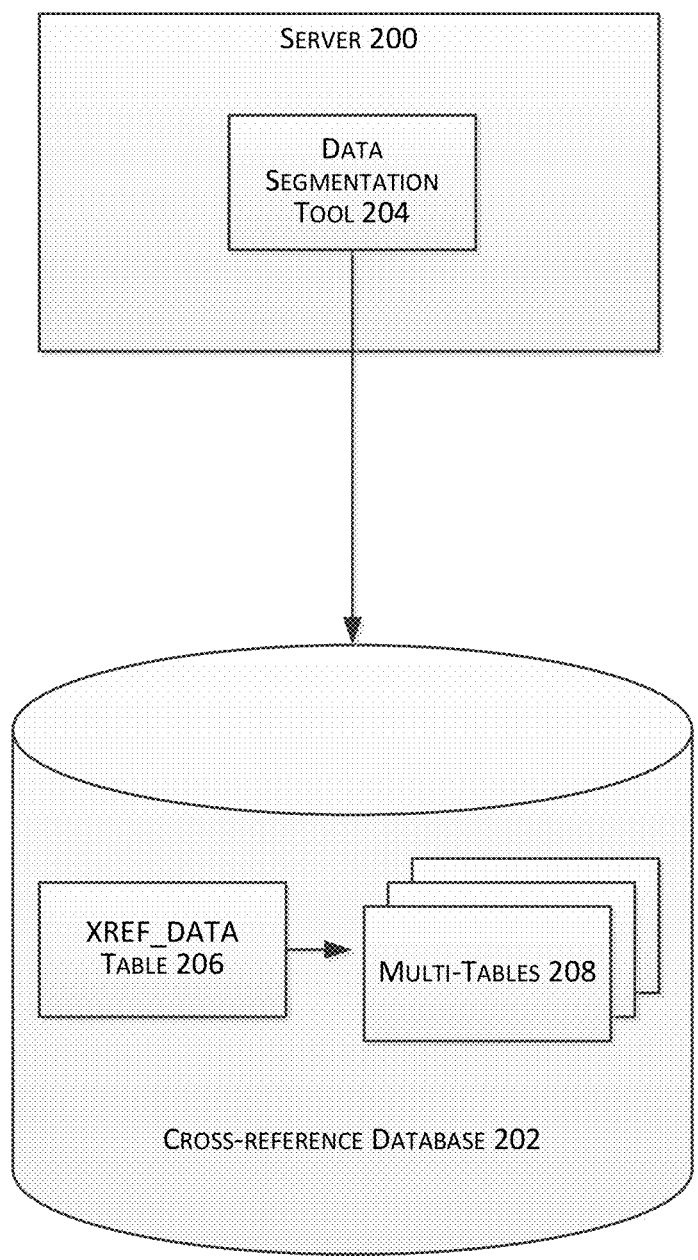
FIG. 2 shows a system for performing multi-data segmentation, in accordance with an embodiment of the present invention.

FIG. 2 shows a system for performing multi-data segmentation, in accordance with an embodiment of the present invention. As shown in FIG. 2, such a system can include a server 200 and a cross-reference database 202 accessible to the server. In accordance with an embodiment the server can communicate with the database directly, over a local area network, or over the internet. The server can be a computer including a computer readable medium and processor, or a cluster of computers. The server can include a multi-table data segmentation tool 204 executing thereon. The cross-reference database 202 can include an XREF_DATA table 206 which includes a cross-reference data as described above with respect to FIG. 1. Using the multi-table data segmentation tool 204, the cross-reference data stored in the XREF_DATA table 206 can be segmented and migrated to a plurality of multi-tables 208. This process is described in greater detail below.

Figure 3:
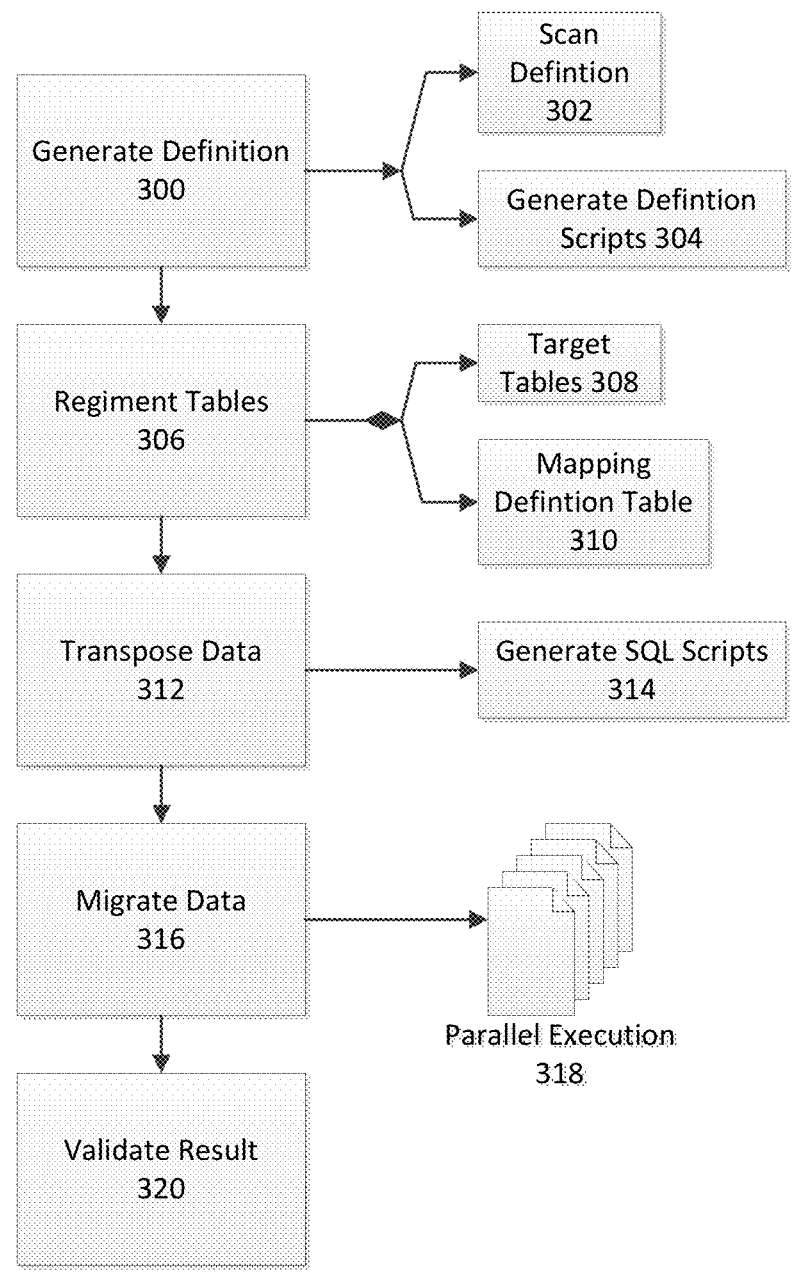
FIG. 3 shows a method of performing multi-data segmentation, in accordance with an embodiment of the present invention.

FIG. 3 shows a method of performing multi-data segmentation, in accordance with an embodiment of the present invention. In accordance with an embodiment, the methods described below can be performed by the multi-table data segmentation tool described above with respect to FIG. 2. As the single cross-reference table grows, the increased time spent looking-up references can lead to a performance bottleneck. In such a case, it can be advantageous to divide the single cross-reference table into a plurality of smaller tables, each corresponding to a different XREF artifact. Each of these smaller tables are referred to herein as multi-tables, and the process of dividing the cross-reference table into a plurality of multi-tables is referred to herein as multi-data segmentation.

As shown in FIG. 3, multi-data segmentation can include a plurality of steps to ensure that the cross-reference data is accurately migrated and can still be quickly identified and used as needed. In accordance with an embodiment of the invention, a multi-data segmentation process is provided to Generate, Regiment, Transpose, Migrate and Validate data from one single cross-reference table to multiple cross-reference multi-tables.

At step 300, new cross-reference definitions are generated for the multi-tables. These definitions can be used to define the structures of the multi-table database tables to be created. At step 302, generating new cross-reference definitions can include scanning the database to identify the original cross-reference definition files (also referred to herein as XREF artifacts) and then using this information to derive the new cross-reference definitions. At step 304, each new definition file can be augmented include multi-table data and scripts, such as SQL scripts, can be generated based on the augmented definition files. When executed these scripts can create new multi-tables corresponding to the augmented definition files. This multi-table data can be additional metadata including a flag which indicates that the XREF data has been moved to a multi-table, and an identifier of the multi-table where the XREF data has been moved. For example, as shown below, under the <table> node: the "mode" attribute can be used as a flag to indicate that the XREF data has been moved to a multi-table, in this example, by using the value "specific". The "dbtable" attribute can include an identifier for the multi-table such as a name of the corresponding multi-table that will be created in the database.

Listing 1. XREF artifact with updated metadata:

```
<?xml version = '1.0' encoding = 'UTF-8'?>
<!-- Upgraded by Xref Upgrade Utility 1.0 -->
<xref xmlns="http://xmlns.oracle.com/xref">
    <table name="BUSINESS_UNIT_ID"
dbtable="XREF_BUSINESS_UNIT_ID" mode="specific">
        <description>
        </description>
        <columns>
        <column name="COMMON"/>
        <column name="EBIZ_01"/>
        <column name="JDEE1_01"/>
        </columns>
    </table>
</xref>
```

At step 306, after the generation of new cross-reference definition files, the new multi-table database tables can be identified and defined. In accordance with an embodiment, at step 308 the new multi-tables are targeted by creating one new corresponding multi-table per new cross-reference definition file. Each of the new cross-reference definition files can be parsed to determine appropriate information to be used when creating the new multi-tables, such as a table name, column names, number of columns, etc. Each of the tables can be named according to the "dbtable" metadata in each new cross-reference definition file. Details of each multi-table, such as a number of columns and column names, can be determined from the <column> elements in each new cross-reference definition file, with a one-to-one correspondence.

Listing 2. Sample multi-table schema, for the new cross-reference artifact for BUSINESS_UNIT_ID

```
CREATE TABLE XREF_BUSINESS_UNIT_ID(
    ROW_ID VARCHAR2(48) NOT NULL,
    COMMON VARCHAR2(2000),
    EBIZ_01 VARCHAR2(2000),
    JDEE1_01 VARCHAR2(2000),
    LAST_MODIFIED TIMESTAMP NOT NULL
);
```

As shown above in Listing 2, each row of the new multi-tables can include columns derived from the new cross-reference definition. Additionally, in accordance with an embodiment, two additional columns ROW_ID and LAST_MODIFIED, can be added. In accordance with an embodiment, database table names or other identifiers may have limited lengths, so at step 310 a mapping table can be created to link the multi-table identifier in the definition file to its corresponding actual database table identifier. In accordance with an embodiment each new multi-table database table can be created using one or more SQL scripts.

At step 312, the XREF data is transposed. During the transpose step, at step 314, an execution plan for segmenting the data over the multi-tables is generated in the form of one or more SQL scripts, with one script created per new cross-reference artifact. Transposition can be executed differently depending on whether the XREF data for a given cross-reference definition is fully mapped. For each cross-reference artifact in the original table with fully-mapped data, the artifacts' columns have values defined for every row number. To migrate these fully-mapped tables, the data can be transposed in bulk into the format of the corresponding multi-table.

Multi-tables that are not fully-mapped, may include null values and/or one-to-many mappings. Null values in multi-tables result from the original single cross-reference table lacking mapped values for some cross-reference artifacts' columns. In this case, data can be transposed for migration as in the case of fully-mapped tables. For tables with one-to-many mappings, an ID for one application is mapped to multiple IDs for another application—i.e., a value in one column may correspond to several values in another column of the table. Artifacts with one-to-many mappings can have their data migrated from the single cross-reference table one row at a time.

At step 316, the XREF data is migrated from the single cross-reference table to each corresponding multi-table by executing the scripts generated during step 314. Each script segments and transforms the data for each new cross-reference artifact into a form that is compatible with that new cross-reference artifact's multi-table, and then copies the segmented and transformed data into the new multi-table. As shown at 318, each script can be designed for parallel execution, to improve performance.

Figure 4A:
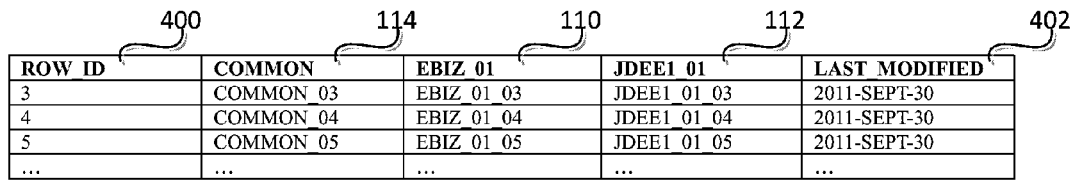
FIGS. 4A, 4B, and 4C show exemplary migrated multi-tables, in accordance with an embodiment of the present invention.
Figure 4B:
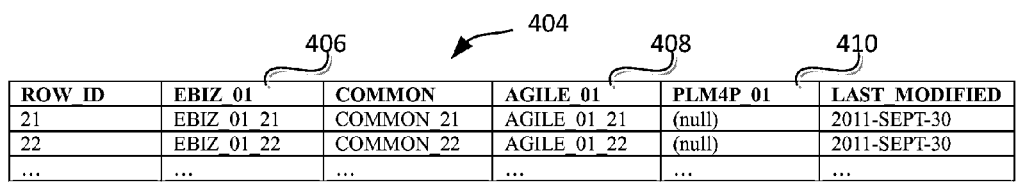
Figure 4C:
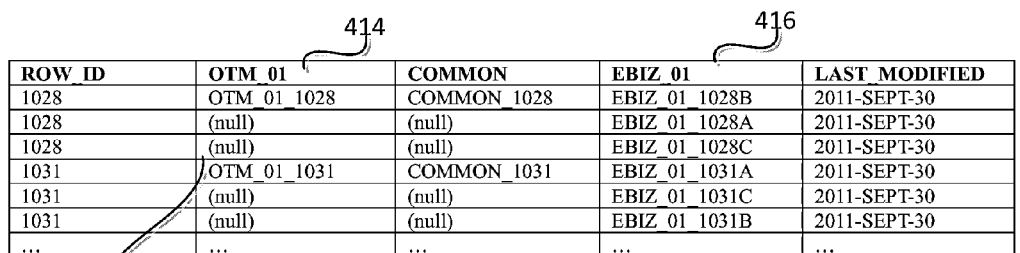

FIGS. 4A, 4B, and 4C show exemplary migrated multi-tables, in accordance with an embodiment of the present invention. FIG. 4A shows an exemplary migrated fully-mapped table for the XREF_BUSINESS_UNIT artifact, in accordance with an embodiment. As shown in FIG. 4A, each row ID 400 corresponds to the row number 104 in FIG. 1. Similarly, columns have been created as per the schema shown in Listing 2 for EBIZ_01 110, JDEE1_01 112 and COMMON 114. Additionally, a new Last Modified column 402 has been added which includes a date upon which the row was last modified.

FIG. 4B shows an example in which a cross-reference artifact includes null values. If a column is defined for an entity in its cross-reference definition, but no values are assigned to that column, then the column is not shown in the XREF_DATA table. Columns including nulls values are identified during regimentation step 306 and are included in the associated multi-table. As shown in FIG. 4B, the entity associated with multi-table 404 includes columns for three application IDs: EBIZ_01 406, AGILE_01 408 and PLM4P 410. Since no values are assigned to PLM4P, each entry is indicated as (null) 412.

FIG. 4C shows an example in which a cross-reference artifact includes one-to-many mappings. Migrated artifacts with one-to-many mappings have resulting multi-tables where single values in one or more columns are mapped to multiple values in a different column. As shown in FIG. 4C, there is one "full" row per distinct row ID, and the other mapped values are in their own rows with just the row ID and null values for the other columns. In the example of FIG. 4C, each OTM_01 value 414 maps to three EBIZ_01 values 416 (e.g., OTM_01_1028 maps to EBIZ_01_1028A, EBIZ_01_1028B and EBIZ_01_1028C). In the resulting multi-table, three rows, sharing the same row ID (e.g., 1028), combine to form one "full" row which fully defines the mapping. In accordance with an embodiment, instead of duplicating data in each column for multiple rows, (null) can be inserted into the table, as shown at 418.

Returning to FIG. 3, at step 320, the migration is validated. The validation can verify the integrity of the segmentation process and results. During migration, monitoring statistics are collected and stored in a monitor table. This enables the migration to be verified to confirm that the data segmentation process has been completed without error for each cross-reference artifact.

FIG. 5 shows an exemplary monitor table, in accordance with an embodiment of the present invention. To ensure all artifacts are migrated, result-checking SQL scripts can be executed at the end of data segmentation to compare metrics associated with the multi-tables to metrics associated with the XREF_DATA table. As shown in FIG. 5, a monitor table 500 can store information about each XREF entity and the migration of that entity's data. This can include the XREF artifact name 502 and a number of rows 504 associated with this artifact in the original XREF_DATA table. In accordance with an embodiment, this number of rows 504 does not include one-to-many rows which, as noted above, can be migrated individually. The monitor table can also be used to track a number of rows which have been migrated 506. This way, the migration can occur in batches, which saves time and processing requirements in case an error occurs. For example, if a million rows are to be migrated and an error occurs requiring a roll-back of all one million rows, this places a significant processing burden on the system. However, by tracking the migration progress and proceeding in batches of, e.g., ten thousand rows, an error can be addressed with a much smaller roll-back. One-to-many rows can be separately tracked similarly to "regular" rows by storing the number of one-to-many rows in the XREF_DATA 508 and the number of one-to-many rows which have been migrated 510. Time stamps can also be recorded for the migration including a time when processing starts 512, a time when one-to-many row identification began 514 and a total time for one-to-many row identification 516. Additionally, the time when "regular" row processing began 518 and a total time for regular row processing 520; and similarly the time when one-to-many row processing began 522 and a total time for one-to-many row processing 524. If an error occurs, an exception flag 526 can be stored which indicates that the current processing batch needs to be rolled-back and re-executed. In accordance with an embodiment, to validate the migration, one or more validation scripts can be executed which compare the number of migrated artifacts against the number of unique cross-reference definitions in the original XREF_DATA table; to be valid, these numbers should be equivalent. Additionally, the number of rows in the original table can be compared with the number of migrated rows, to be valid these numbers should also be equivalent.

Figure 6:
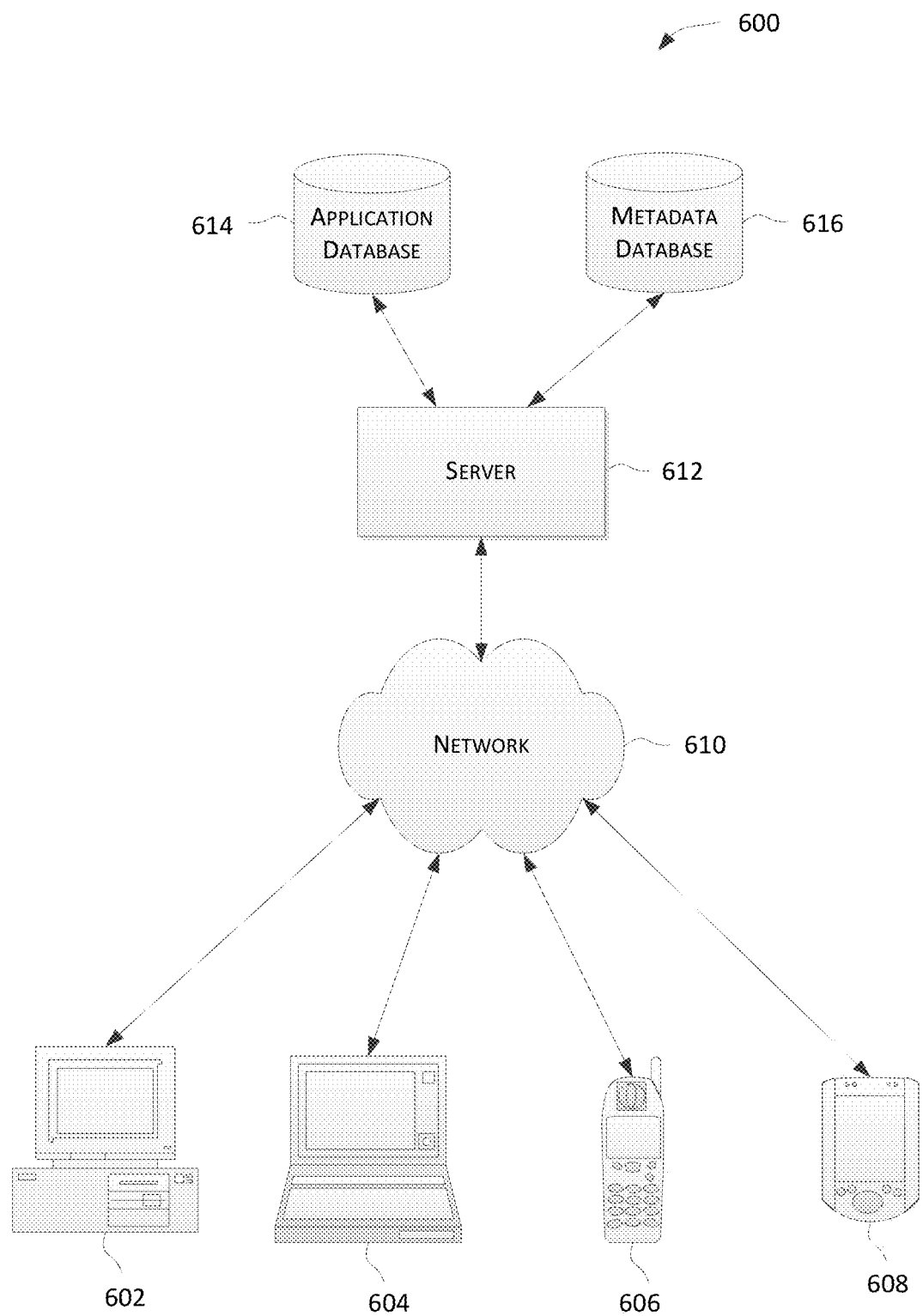
FIG. 6 is a simplified block diagram illustrating components of a system environment that may be used in accordance with some embodiments of the present invention.

FIG. 6 is a simplified block diagram illustrating components of a system environment 600 that may be used in accordance with some embodiments of the present invention. As shown, system environment 600 includes one or more client computing devices 602, 604, 606, 608, which are configured to operate a client application such as a web browser, proprietary client (e.g., Oracle Forms), or the like. In various embodiments, client computing devices 602, 604, 606, and 608 may interact with a server 612.

Client computing devices 602, 604, 606, 608 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 602, 604, 606, and 608 may be any other electronic device, such as a thin-client computer, Internet-enabled gaming system, and/or personal messaging device, capable of communicating over a network (e.g., network 610 described below). Although system environment 600 is shown with four client computing devices, any number of client computing devices may be supported. Other devices such as devices with sensors, etc. may interact with server 612. Authorization requests may be received from one or more client devices.

System environment 600 may include a network 610. Network 610 may be any type of network familiar to those skilled in the art that can support data communications using any of a variety of commercially-available protocols, including without limitation TCP/IP, SNA, IPX, AppleTalk, and the like. Merely by way of example, network 610 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 600 also includes one or more server computers 612 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 612 may be adapted to run one or more services or software applications described in the foregoing disclosure.

Server 612 may run an operating system including any of those discussed above, as well as any commercially available server operating system. Server 612 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 600 may also include one or more databases 614, 616. Databases 614, 616 may reside in a variety of locations. By way of example, one or more of databases 614, 616 may reside on a storage medium local to (and/or resident in) server 612. Alternatively, databases 614, 616 may be remote from server 612, and in communication with server 612 via a network-based or dedicated connection. In one set of embodiments, databases 614, 616 may reside in a storage-area network (SAN) familiar to those skilled in the art. Similarly, any necessary files for performing the functions attributed to server 612 may be stored locally on server 612 and/or remotely, as appropriate. In one set of embodiments, databases 614, 616 may include relational databases, such as Oracle 10g, 11g, Release 12, etc., which are adapted to store, update, and retrieve data in response to SQL-formatted and other commands. In one embodiment, policies configured to controlling a set of resources may be stored by one of the databases.

Figure 7:
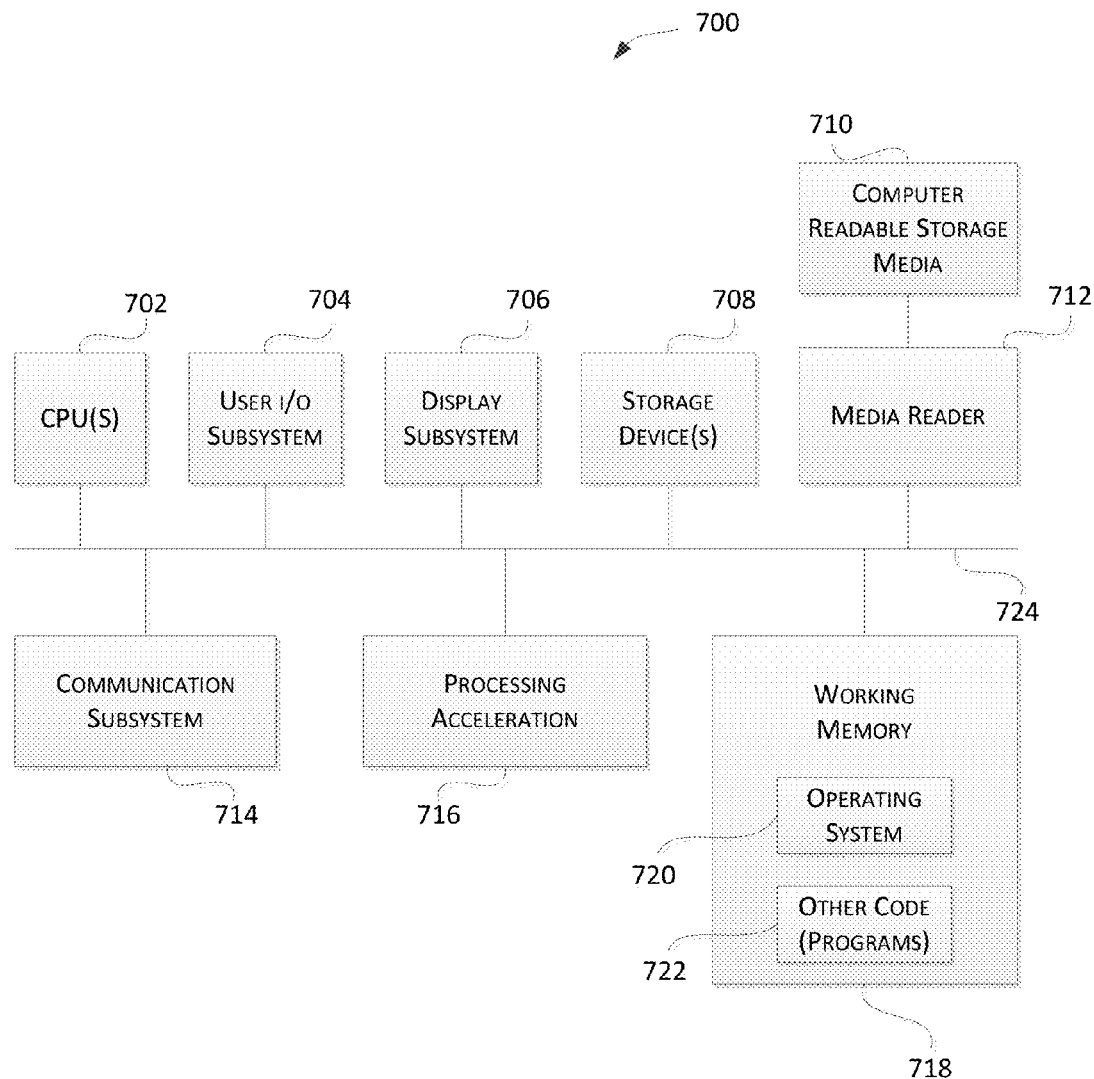
FIG. 7 is a simplified block diagram of a computing system that may be used in accordance with embodiments of the present invention.

FIG. 7 is a simplified block diagram of a computing system 700 that may be used in accordance with embodiments of the present invention. For example, the system depicted in FIG. 2 may be implemented using a system such as system 700. Computer system 700 is shown comprising hardware elements that may be electrically coupled via a bus 724. The hardware elements may include one or more central processing units (CPUs) 702, one or more input devices 704 (e.g., a mouse, a keyboard, etc.), and one or more output devices 706 (e.g., a display device, a printer, etc.). The CPUs may include single or multicore CPUs. Computer system 700 may also include one or more storage devices 708. By way of example, the storage device(s) 708 may include devices such as disk drives, optical storage devices, and solid-state storage devices such as a random access memory (RAM) and/or a read-only memory (ROM), which can be programmable, flash-updateable and/or the like.

Computer system 700 may additionally include a computer-readable storage media reader 712, a communications subsystem 714 (e.g., a modem, a network card (wireless or wired), an infra-red communication device, etc.), and working memory 718, which may include RAM and ROM devices as described above. In some embodiments, computer system 700 may also include a processing acceleration unit 716, which can include a digital signal processor (DSP), a special-purpose processor, and/or the like.

Computer-readable storage media reader 712 can further be connected to a computer-readable storage medium 710, together (and, optionally, in combination with storage device(s) 708) comprehensively representing remote, local, fixed, and/or removable storage devices plus storage media for temporarily and/or more permanently containing computer-readable information. Communications system 714 may permit data to be exchanged with network 1810 and/or any other computer described above with respect to system environment 1800.

Computer system 700 may also comprise software elements, shown as being currently located within working memory 718, including an operating system 720 and/or other code 722, such as an application program (which may be a client application, Web browser, mid-tier application, RDBMS, etc.). In an exemplary embodiment, working memory 718 may include executable code and associated data structures such as memory structures used for processing authorization requests described above. It should be appreciated that alternative embodiments of computer system 700 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data. Examples of storage and computer-readable media include RAM, ROM, EEPROM, flash memory or other memory technology, CD-ROM, digital versatile disk (DVD) or other optical storage, magnetic cassettes, magnetic tape, magnetic disk storage or other magnetic storage devices, or any other memory medium which can be used to store the desired information and which can be read by a computer. Storage media and computer readable media may include non-transitory memory devices.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims.

What is claimed is:

1. A method for multi-table data segmentation, the method comprising:
   identifying a plurality of definition files associated with a cross-reference table of a database, wherein each of the plurality of definition files defines a mapping from an application-specific format to a common format;
   generating a plurality of multi-table definition files by augmenting each of the plurality of definition files to include a multi-table identifier and a multi-table flag;
   creating a plurality of multi-tables from the cross-reference table based on the previously generated plurality of multi-table definition files, wherein each multi-table is created using a different one of the plurality of multi-table definition files such that a given one of plurality of multi-table definition files is used to define one or more table structures of a corresponding one of the plurality of multi-tables;
   transposing data stored in the cross-reference table to the plurality of multi-tables based on the plurality of multi-table definition files; and
   migrating the transposed data from the cross-reference table to the plurality of multi-tables.

2. The method of claim 1 wherein creating a plurality of multi-tables comprises:
   parsing each multi-table definition file to determine table information for that multi-table definition file, wherein the table information includes a name, a number of columns, and column names;
   automatically generating a plurality of scripts, wherein each script defines one of the multi-tables and wherein each script is generated using the table information parsed from a different one of the multi-table definition files; and
   executing each of the plurality of scripts to create the plurality of multi-tables.

3. The method of claim 1 further comprising:
   creating a mapping definition table wherein the mapping definition table maps each multi-table definition file to its associated multi-table.

4. The method of claim 1 wherein transposing data stored in the database table to the plurality of multi-tables based on the plurality of multi-table definition files comprises:
   generating a transposition script for each of the multi-table definition files, wherein each transposition script defines how the data associated with that multi-table definition file is segmented and transformed to be compatible with that multi-table definition file's associated multi-table.

5. The method of claim 4 wherein migrating the transposed data from the database table to the plurality of multi-tables comprises:
   executing each transposition script to segment and transform the data associated with each multi-table definition file; and
   copying the segmented and transformed data from the database table to the plurality of multi-tables.

6. The method of claim 1, further comprising:
   validating that the transposed data has been successfully migrated to the plurality of multi-tables.

7. A non-transitory computer readable storage medium including instructions stored thereon which, when executed by a processor, cause the processor to perform the steps of:
   identifying a plurality of definition files associated with a cross-reference table of a database, wherein each of the plurality of definition files defines a mapping from an application-specific format to a common format;
   generating a plurality of multi-table definition files by augmenting each of the plurality of definition files to include a multi-table identifier and a multi-table flag;
   creating a plurality of multi-tables from the cross-reference table based on the previously generated plurality of multi-table definition files, wherein each multi-table is created using a different one of the plurality of multi-table definition files such that a given one of plurality of multi-table definition files is used to define one or more table structures of a corresponding one of the plurality of multi-tables;
   transposing data stored in the cross-reference table to the plurality of multi-tables based on the plurality of multi-table definition files; and
   migrating the transposed data from the cross-reference table to the plurality of multi-tables.

8. The non-transitory computer readable storage medium of claim 7 wherein the instructions which, when executed by the processor, cause the processor to perform the step of creating a plurality of multi-tables, further comprise instructions which when executed, cause the processor to perform the steps of:
   parsing each multi-table definition file to determine table information for that multi-table definition file, wherein the table information includes a name, a number of columns, and column names;
   automatically generating a plurality of scripts, wherein each script defines one of the multi-tables and wherein each script is generated using the table information parsed from a different one of the multi-table definition files; and executing each of the plurality of scripts to create the plurality of multi-tables.

9. The non-transitory computer readable storage medium of claim 7 further comprising instructions which, when executed by the processor, cause the processor to perform the step of:

creating a mapping definition table wherein the mapping definition table maps each multi-table definition file to its associated multi-table.

10. The non-transitory computer readable storage medium of claim 7 wherein the instructions which, when executed by the processor, cause the processor to perform the step of transposing data stored in the database table to the plurality of multi-tables based on the plurality of multi-table definition files further comprise instructions which, when executed, cause the processor to perform the step of:

generating a transposition script for each of the definition files, wherein each transposition script defines how the data associated with that multi-table definition file is segmented and transformed to be compatible with that multi-table definition file's associated multi-table.

11. The non-transitory computer readable storage medium of claim 10 wherein the instructions which, when executed by the processor, cause the processor to perform the step of migrating the transposed data from the database table to the plurality of multi-tables further comprise instructions which, when executed, cause the processor to perform the steps of:

executing each transposition script to segment and transform the data associated with each multi-table definition file; and copying the segmented and transformed data from the database table to the plurality of multi-tables.

12. The non-transitory computer readable storage medium of claim 7, further comprising instructions which, when executed by the processor, cause the processor to perform the step of:

validating that the transposed data has been successfully migrated to the plurality of multi-tables.

13. A system for multi-table data segmentation, the system comprising:

a computer, including a non-transitory computer readable storage medium and processor;

a database including a cross-reference data table and a plurality of definition files, wherein each of the plurality of definition files defines a mapping from an application-specific format to a common format;

a multi-table data segmentation tool, executing on the computer, wherein the multi-table data segmentation tool is operable to identify the plurality of definition files;

generate a plurality of multi-table definition files by augmenting each of the plurality of definition files to include a multi-table identifier and a multi-table flag;

create a plurality of multi-tables from the cross-reference table based on the previously generated plurality of multi-table definition files, wherein each multi-table is created using a different one of the plurality of definition files such that a given one of plurality of multi-table definition files is used to define one or more table structures of a corresponding one of the plurality of multi-tables;

transpose data stored in the cross-reference table to the plurality of multi-tables based on the plurality of definition files; and migrate the transposed data from the cross-reference table to the plurality of multi-tables.

14. The system of claim 13 wherein the when the multi-table data segmentation tool creates a plurality of multi-tables, the multi-table data segmentation tool is further operable to:

parse each multi-table definition file to determine table information for that multi-table definition file, wherein the table information includes a name, a number of columns, and column names;

automatically generate a plurality of scripts, wherein each script defines one of the multi-tables and wherein each script is generated using the table information parsed from a different one of the multi-table definition files; and execute each of the plurality of scripts to create the plurality of multi-tables.

15. The system of claim 13 further comprising:

a mapping definition table wherein the mapping definition table maps each multi-table definition file to its associated multi-table; and a monitor table which stores data about the migration, wherein the monitor table can be used by the multi-table data segmentation tool to validate the migration.

16. The system of claim 13 wherein when the multi-table data segmentation tool transposes data stored in the database table to the plurality of multi-tables based on the plurality of multi-table definition files, the multi-table data segmentation tool is further operable to:

generate a transposition script for each of the multi-table definition files, wherein each transposition script defines how the data associated with that multi-table definition file is segmented and transformed to be compatible with that multi-table definition file's associated multi-table.

17. The system of claim 16 wherein when the multi-table data segmentation tool migrates the transposed data from the database table to the plurality of multi-tables, the multi-table data segmentation tool is further operable to:

execute each transposition script to segment and transform the data associated with each multi-table definition file; and copy the segmented and transformed data from the database table to the plurality of multi-tables.

* * * * *

UNITED STATES PATENT AND TRADEMARK OFFICE
CERTIFICATE OF CORRECTION

PATENT NO. : 9,507,837 B2
APPLICATION NO. : 13/633064
DATED : November 29, 2016
INVENTOR(S) : Fan et al.

It is certified that error appears in the above-identified patent and that said Letters Patent is hereby corrected as shown below:

In the Drawings

On Sheet 3 of 7, in FIG. 3, under Reference Numeral 302, Line 2, delete "Defintion" and insert -- Definition --, therefor.

On Sheet 3 of 7, in FIG. 3, under Reference Numeral 304, Line 1, delete "Defintion" and insert -- Definition --, therefor.

On Sheet 3 of 7, in FIG. 3, under Reference Numeral 310, Line 2, delete "Defintion" and insert -- Definition --, therefor.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*